March 15, 1966 H. A. DEWENTER 3,240,246
BLENDER
Filed Oct. 16, 1963 3 Sheets-Sheet 1
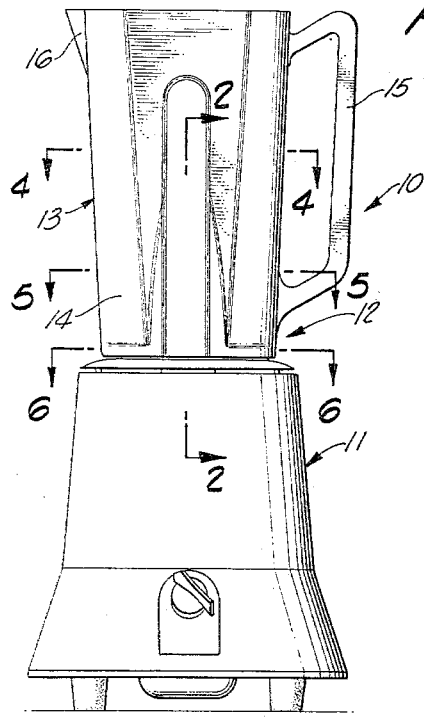
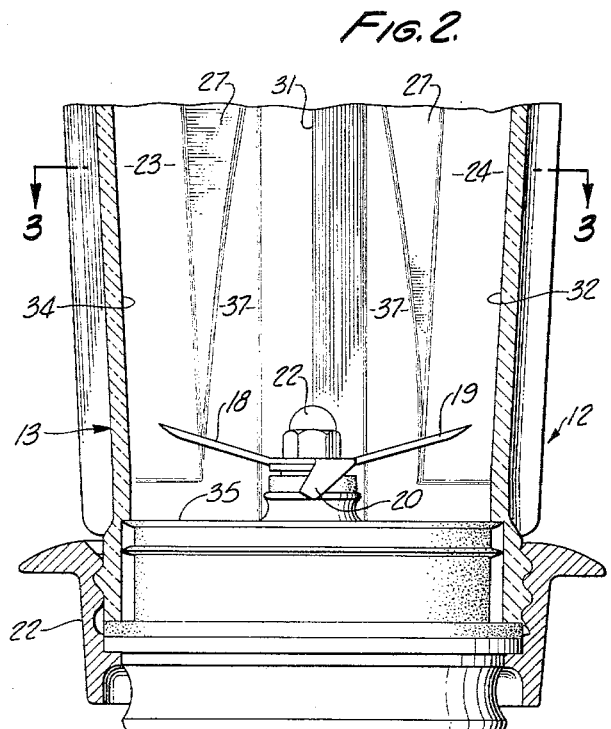
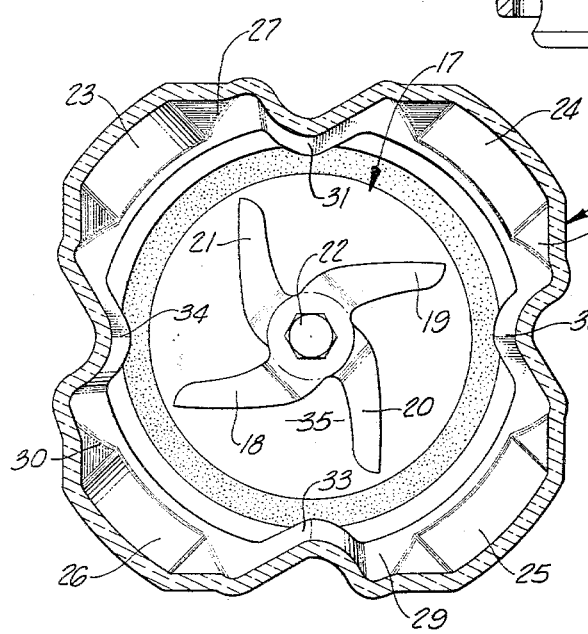
HENRY A. DEWENTER
INVENTOR.
KENDRICK AND STOLZY
BY
ATTORNEYS March 15, 1966  H. A. DEWENTER  3,240,246
BLENDER Filed Oct. 16, 1963  3 Sheets-Sheet 2

HENRY A. DEWENTER
INVENTOR.
KENDRICK AND STOLZY
BY
*H Donald Stolzy*
ATTORNEYS

March 15, 1966 H. A. DEWENTER 3,240,246
BLENDER

Filed Oct. 16, 1963 3 Sheets-Sheet 3

HENRY A. DEWENTER
INVENTOR.
KENDRICK AND STOLZY
BY
ATTORNEYS

3,240,246
BLENDER
Henry A. Dewenter, 1477 Old Mill Road,
San Marino, Calif.
Filed Oct. 16, 1963, Ser. No. 316,671
7 Claims. (Cl. 146—68)

This invention relates to devices for mixing and for comminuting materials, and more particularly to a blender container assembly which facilitates improved and rapid comminution.

One of the principal requirements of a good blender is that it comminute materials to very fine particles within a very short time. The device of the present invention excels prior art mixers by meeting and exceeding this requirement. This is accomplished, in accordance with the present invention, by providing a receptacle having a substantially cylindrical wall base portion with inwardly extending vertical ribs, arcuate portions of the wall in alternate frusto-conical and flat sections at the top of the receptacle.

The above described and other advantages of the present invention will be better understood from the following description when considered in connection with the accompanying drawings.

In the drawings which are to be regarded as merely illustrative:

FIG. 1 is a side elevational view of a mixer constructed in accordance with the present invention;

FIG. 2 is a broken away transverse sectional view of a container assembly taken on the line 2—2 shown in FIG. 1;

FIG. 3 is a transverse sectional view of the container assembly taken on the line 3—3 shown in FIG. 2;

Figure 4:
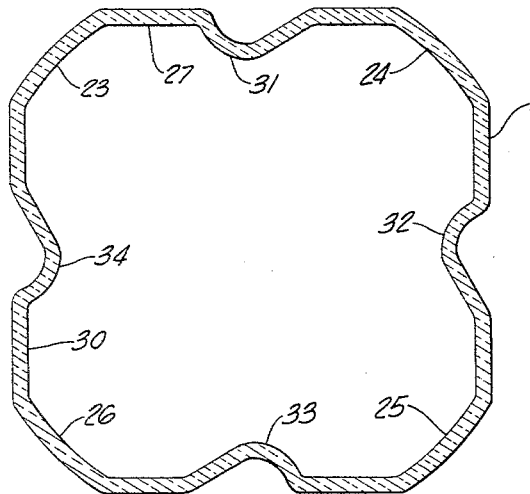
Figure 5:
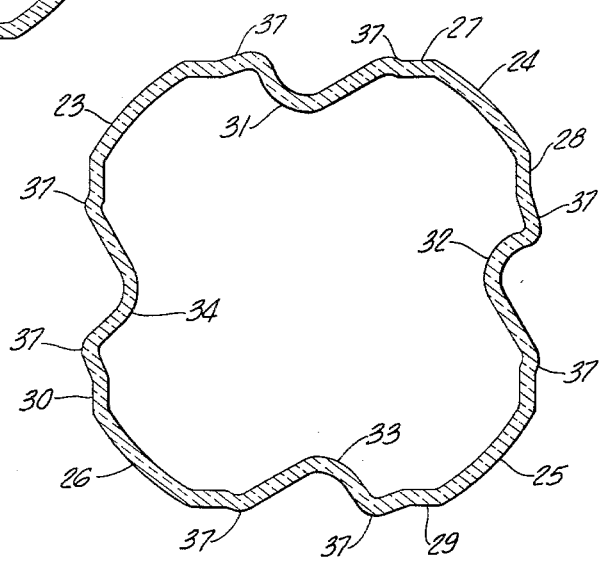
Figure 6:
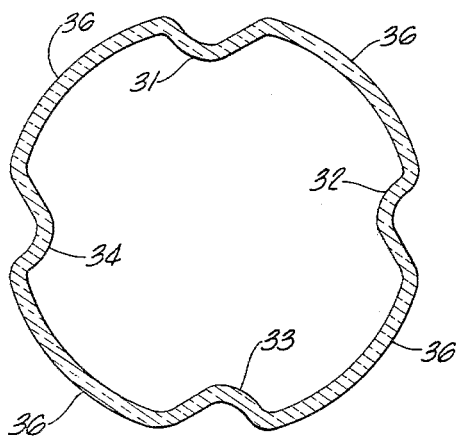
Figure 7:
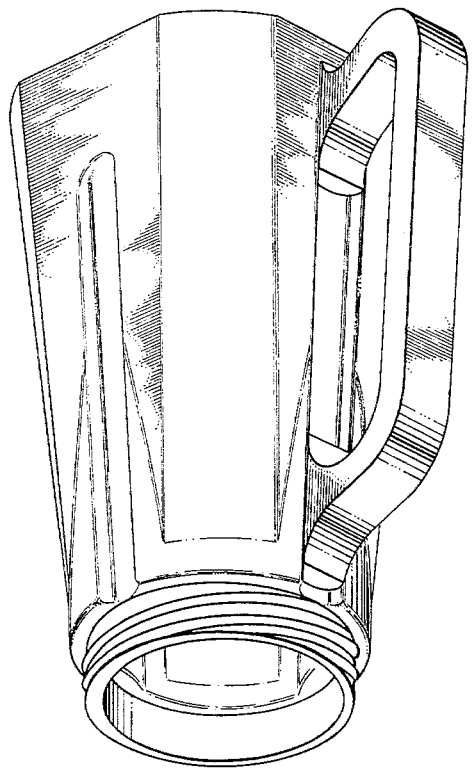

FIGS. 4, 5 and 6 are transverse sectional views of the container assembly taken respectively on the lines 4—4, 5—5 and 6—6 shown in FIG. 1; and FIG. 7 is an upwardly looking perspective view of the container assembly of the present invention.

A mixer 10 is shown in FIG. 1 including a base assembly 11 and a container assembly 12. The base assembly 11 may be identical to base assembly 11 shown in U.S. Patent No. 3,064,949. Container assembly 12 may be identical to container assembly 200 shown in said patent except for a clear plastic body 13 in which materials to be mixed are placed. Body 13 is provided with a vertically extending wall 14, a handle 15 and a pouring spout 16. Both the upper end and the lower end of body 13 are open. The lower end of body 13 is closed by an insert 17 which may be identical to insert 122 shown in the said patent. Insert 17 is provided with two upwardly extending cutting blades 18 and 19 and two downwardly extending cutting blades 20 and 21. Blades 18 and 19 are symmetrical about the vertical axis of body 13. The same is true of blades 20 and 21. Insert 17 is held in place in the lower end of body 13 by an annular screw cap 22 identical to screw cap 109 shown in the said patent.

Note will be taken that above an upper surface 35 of insert 17, body 13 is perfectly symmetrical about its vertical axis except for handle 15 and pouring spout 16, handle 15 simply being affixed to the exterior of body 13.

A substantial improvement in the speed and effect of comminution is achieved through the use of eight separate spaced internal surfaces in body 13 with four approximately vertically extending ribs. The important surfaces of body 13 are indicated at 23, 24, 25, 26, 27, 28, 29 and 30. Note will be taken that surfaces 27, 28, 29 and 30 are molded with internal ribs at 31, 32, 33 and 34 respectively.

All surfaces 27, 28, 29 and 30 are flat and inclined with respect to the axis of body 13.

Surfaces 23, 24, 25 and 26 are sections of the surface of a cone. They are therefore portions of the surface of a frustrum of a cone and are therefore frusto-conical.

Surfaces 23, 24, 25 and 26 are frusto conical. However, these latter surfaces show only as an arcuate portion of a circle in the section taken in FIG. 4.

Perhaps the section of FIG. 5 may be better understood first by the reference of FIG. 7. Note will be taken that surfaces 23, 24, 25 and 26 are frusto-conical down to a portion 36 which is cylindrical. Portions at 37 are also surfaces of the same cylinder. Similar portions of surface 37 are shown in FIG. 5. Note will be taken from FIG. 6, that surfaces 23, 24, 25, 26, 27, 28, 29 and 30 have all disappeared.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. A mixing container comprising: a receptacle having peripheral frusto-conical and flat internal wall surface sections extending in an approximately vertical direction, said frusto-conical sections being disposed alternately between said flat sections, said flat sections being inclined away from each other toward the top of said receptacle.

2. A mixing container comprising: a receptacle having peripheral frusto-conical and flat internal wall surface sections extending in an approximately vertical direction, said frusto-conical sections being disposed alternately between said flat sections, said flat sections being inclined away from each other toward the top of said receptacle, said flat sections having vertically extending rib elements thereon.

3. A mixing container comprising: a receptacle having peripheral frusto-conical and flat internal wall surface sections extending in an approximately vertical direction, said frusto-conical sections being disposed alternately between said flat sections, said flat sections being inclined away from each other toward the top of said receptacle, said frusto-conical sections being four in number, said flat sections also being four in number, said sections being symmetrically positioned about a vertical axis.

4. A mixing container comprising: a receptacle having peripheral frusto-conical and flat internal wall surface sections extending in an approximately vertical direction, said frusto-conical sections being disposed alternately between said flat sections, said flat sections being inclined away from each other toward the top of said receptacle, said frusto-conical sections being four in number, said flat sections also being four in number, said sections being symmetrically positioned about a vertical axis, said flat sections having vertically extending rib elements thereon.

5. In a mixer, a container assembly comprising: a tube-like body open at both of its lower and upper ends; an insert to cover the lower end of said body; an annular screw cap to hold said insert over the lower end of said body; a drive shaft rotatable through said insert; blade means fixed to said drive shaft inside said body, said body having peripheral frusto-conical and flat internal wall surface sections extending in an approximately vertical direction, said frusto-conical sections being disposed alternately between said flat surface sections, said flat sections being inclined away from each other toward the upper end of said body, said frusto-conical sections being four in number, said flat sections also being four in number, said sections being symmetrically positioned about a vertical axis, each of said flat sections having a vertically extending centrally located rib element thereon; a handle fixed to one side of said body; and a spout in said body on a side thereof opposite said one side.

6. A mixing container comprising: a receptacle having a substantially cylindrical base portion wall and an upper portion, said upper portion having inwardly extending vertical rib elements, said upper portion having two pairs of frusto-conical sections and two pairs of flat sections, said frusto-conical sections being disposed alternately between said flat sections, said wall terminating in said sections, the flat sections of each pair thereof extending away from each other at the top of said receptacle, said receptacle having a vertical axis of symmetry, one pair of said flat sections lying in planes perpendicular to those of the other pair thereof.

7. A mixing container comprising: a receptacle having a substantially cylindrical base portion wall and an upper portion, said upper portion having frusto-conical and flat sections, said wall terminating in said frusto-conical and flat sections, said frusto-conical sections being disposed alternately between said flat sections, said flat sections extending away from each other at the top of said receptacle, said upper portion having two pairs of said flat sections, said receptacle having a vertical axis of symmetry, one pair of said flat sections lying in planes perpendicular to those of the other pair thereof, said upper receptacle portion having rib elements extending upwardly in said receptacle inwardly of said flat sections thereof.

References Cited by the Examiner

UNITED STATES PATENTS

| | | | |
|---|---|---|---|
| D. 184,306 | 1/1959 | De Angeles. | |
| 2,109,501 | 3/1938 | Osius | 259—108 |
| 2,278,125 | 3/1942 | Landgraf | 249—108 |
| 2,284,155 | 5/1942 | Landgraf | 259—108 |
| 2,758,623 | 8/1956 | Malf et al. | 259—108 X |
| 2,794,627 | 6/1957 | Rodwick | 259—108 |
| 2,896,924 | 7/1959 | Jepson | 259—108 |
| 2,924,349 | 2/1960 | Huck | 259—104 X |
| 2,940,738 | 6/1960 | Posener et al. | 259—107 |

FOREIGN PATENTS

| | | |
|---|---|---|
| 167,612 | 7/1960 | Austria. |
| 511,651 | 1/1955 | Italy. |

CHARLES A. WILLMUTH, *Primary Examiner.*